United States Patent [19]

Matsuo

[11] Patent Number: 4,864,404
[45] Date of Patent: Sep. 5, 1989

[54] NOISE REDUCTION CIRCUIT OF A VIDEO SIGNAL

[75] Inventor: Yasutoshi Matsuo, Kawasaki, Japan

[73] Assignee: Victor Company of Japan, Ltd., Japan

[21] Appl. No.: 209,650

[22] Filed: Jun. 21, 1988

Related U.S. Application Data

[63] Continuation-in-part of Ser. No. 195,585, May 18, 1988.

[30] Foreign Application Priority Data

Jun. 22, 1987 [JP] Japan ................................ 62-155129

[51] Int. Cl.$^4$ ..................... H04N 9/64; H04N 5/91; H04N 5/213
[52] U.S. Cl. ..................... 358/167; 358/340; 358/36
[58] Field of Search ................. 358/36, 37, 166, 167, 358/340, 327; 455/293

[56] References Cited

U.S. PATENT DOCUMENTS

| | | | |
|---|---|---|---|
| 4,597,021 | 6/1986 | Yamamitsu et al. | 358/340 |
| 4,607,285 | 8/1986 | Huita et al. | 358/167 |
| 4,652,922 | 3/1987 | Ozaki | 358/167 |
| 4,698,696 | 10/1987 | Matsuo | 358/167 |
| 4,709,269 | 11/1987 | Ozaki | 358/167 |
| 4,750,037 | 6/1988 | Kido et al. | 358/167 |
| 4,768,094 | 8/1988 | Ichimoi | 358/167 |
| 4,779,133 | 10/1988 | Sugimari | 358/167 |

Primary Examiner—James J. Groody
Assistant Examiner—John K. Peng

[57] ABSTRACT

A noise reduction circuit for use in a video signal recording and/or reproducing apparatus for eliminating noise components from an input luminance signal comprises a high pass filter circuit for extracting a high frequency signal component from the input luminance signal, a first limiter circuit for limiting the high frequency signal component at a first limiting level, a multiplier circuit for determining the degree of preemphasis and/or deemphasis by multiplying a predetermined coefficient to the limited signal, summing and subtracting circuits respectively for adding and subtracting the output signal of the first amplifying means to and from the input luminance signal, and a feedback loop for feeding back the output signal of the high pass filter circuit to its input port. The feedback loop comprises a second multiplier circuit which modifies the amplitude of the signal passing therethrough by a second level which is set substantially higher than the first level of the first limiter circuit.

6 Claims, 3 Drawing Sheets

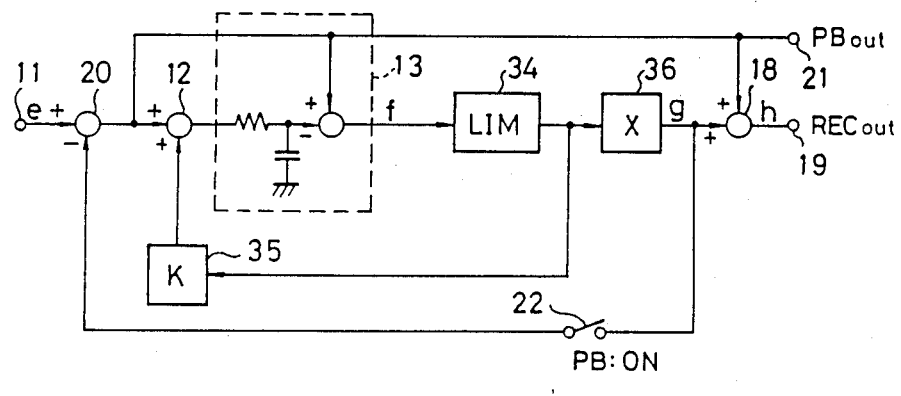
FIG. 1
PRIOR ART
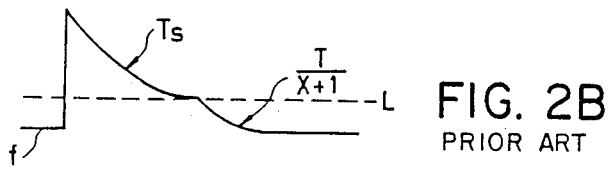
FIG. 2A
PRIOR ART
FIG. 2B
PRIOR ART
FIG. 2C
PRIOR ART
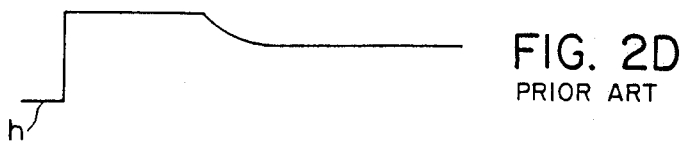
FIG. 2D
PRIOR ART FIG. 3
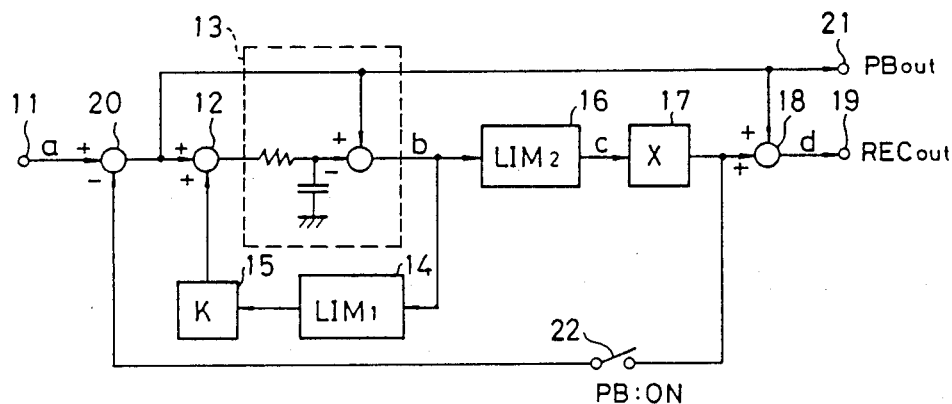
FIG. 4
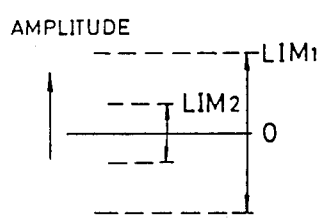
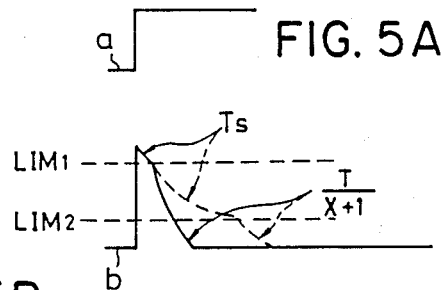
FIG. 5A
FIG. 5B
FIG. 5C
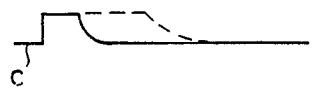
FIG. 5D

1

NOISE REDUCTION CIRCUIT OF A VIDEO SIGNAL

CROSS-REFERENCES TO RELATED APPLICATIONS

This is a continuation-in-part of the application "Noise Reduction Circuit of A Video Signal" filed on May 18, 1988 as No. 07/195,585 in which the assignee is same as the assignee of the present application.

BACKGROUND OF THE INVENTION

The present invention generally relates to noise reduction circuits, and more particularly to a noise reduction circuit for use in a video signal recording and/or reproducing apparatus such as a video tape recorder in order to eliminate noise components.

Video tape recorders using a so called color-under recording system are widely used. In such a video tape recorder, a luminance signal is frequency modulated and recorded on a magnetic tape together with a frequency converted carrier chrominance signal having a frequency range lower than that of the luminance signal in accordance with the frequency division multiplexing technique. Such a video tape recorder has a tendency that the signal-to-noise ratio (S/N ratio) deteriorates with increasing frequency due to the increase of noise components having a so called triangular spectrum. In order to avoid this problem, the video tape recorder uses a noise reduction circuit which employs a preemphasis to the luminance signal to be recorded prior to the frequency modulation. In other words, a high frequency component of the luminance signal is extracted and added to the original luminance signal after suitable processing. As a result of the preemphasis, the high frequency component of the luminance signal is enhanced. At the time of reproduction, the same noise reduction circuit is used to perform a deemphasis, which is complementary to the preemphasis, on the demodulated luminance signal in order to complement the preemphasis. In the description hereinafter, the term emphasis will be used to include both preemphasis at the time of recording and deemphasis at the time of reproduction.

In recent years, there has been a need to increase the degree of emphasis mainly as a result of the broadened frequency range of the video tape recorder, for example from the conventional 3 MHz range to 5 MHz range. Generally, the increase in the degree of emphasis certainly increases the effect of noise reduction. However, if the degree of emphasis applied is excessive, the carrier frequency of the frequency modulated luminance signal would deviate too much. This would result in a so called inverted white peak in the reproduced picture. In other words, when the degree of preemphasis of the high frequency component of the luminance signal becomes excessive as a result of the preemphasis, the side band components of the frequency modulated luminance signal interfere with the frequency converted carrier chrominance signal to such an extent that the reproduced color signal is deteriorated. In order to prevent the excessive frequency modulation of the luminance signal, a white clip circuit is usually used to eliminate from the frequency modulated luminance signal the frequency component deviating to such an extent that it interferes with the frequency converted carrier chrominance signal. However, the use of such a white clip circuit is associated with a possibility of causing a poor picture quality due to the fact that the circuit may cut too much of deviated frequency component.

In order to avoid this problem, the conventional noise reduction circuit uses a limiter circuit which limits the amplitude of the high frequency component of the luminance signal at a predetermined level. Such a limiter circuit generally has an input versus output characteristic which changes the slope of the characteristic curve stepwise in two stages as the amplitude of the input signal increases.

Conventionally, there is a noise reduction circuit as disclosed in the Laid-open Japanese Patent Application No. 27178/1988 in which the applicant is the assignee of the present application. At the time of recording, the noise reduction circuit operates as a preemphasis circuit and an input luminance signal is subjected to amplitude limitation in a limiter circuit after passing through a high pass filter circuit. An output signal of the limiter circuit is on one hand looped back to an input port of the high pass filter via a feedback loop including a multiplier for modifying the amplitude of the signal passing therethrough by a predetermined coefficient. The output signal of the limiter circuit is on the other hand is passed through a second multiplier for modifying the amplitude of the signal passing therethrough by another predetermined coefficient which defines the degree of emphasis and an output luminance signal applied with preemphasis is obtained by summation of an output signal from the second multiplier and the original luminance signal. At the time of reproduction, the output signal thus obtained from the second multiplier is subtracted from the input luminance signal which is already applied with preemphasis and an output signal compensated with the effect of preemphasis is obtained.

In such a conventional noise reduction circuit, it is known according to the Laid-open Japanese Patent Application No. 27178/1983 that both the random noise and a horizontally streaking noise which appears responsive to an input of an impulsive noise can be effectively suppressed by setting the time constant of the high pass filter as $$T > Ts > T/(X+1)$$

where T stands for a time constant corresponding to a lower limit frequency at which the effect of preemphasis or deemphasis becomes effective.

As will be explained in detail later with reference to the drawings, such a noise reduction circuit responds to an incoming luminance signal with a time constant Ts if the level of the high frequency signal component in the luminance signal exceeds a predetermined level set by the limiter circuit, while the circuit responds with a time constant $T/(X+1)$ when the level of the high frequency component signal in the incoming signal is decreased below the level set by the limiter circuit. As the time constant Ts is set larger than the time constant $T/(X+1)$, the noise reduction circuit at first responds with the large time constant in correspondence to the portion of the high frequency luminance signal component exceeding the level of the limiter circuit and then responds with the small time constant in correspondence to the portion of the high frequency signal component which is smaller than the level of the limiter circuit. Thus, the time period in which the noise reduction circuit operates with the time constant Ts is usually longer than the time period in which the noise reduction circuit operates with the time constant $T/(X+1)$. This results in an increase in the degree of emphasis in the relatively lower frequency range of the luminance signal. However, such an operation is contradictory to the purpose of the emphasis to enhance or diminish only the high frequency signal component of the luminance signal.

SUMMARY OF THE INVENTION

Accordingly, it is a general object of the present invention to provide a novel and useful noise reduction circuit in which the problems aforementioned are eliminated.

Another and more specific object of the present invention is to provide a noise reduction circuit for a video signal recording and/or reproducing apparatus for eliminating noise components from an input luminance signal by applying a preemphasis and/or deemphasis to the input luminance signal in which both the random noise and the horizontally streaking noise are suppressed without causing an increase in the degree of emphasis in a low frequency signal component in the input luminance signal.

Another object of the present invention is to provide a noise reduction circuit for a video signal recording and/or reproducing apparatus comprising a high pass filter circuit for extracting a high frequency signal component from an input luminance signal, a first limiter circuit for limiting the amplitude of an output signal of the high pass filter circuit at a first predetermined limiting level, a first multiplier circuit for modifying the amplitude of an output signal of the first limiter circuit by a first predetermined factor, a summing circuit for summing an output signal of the first multiplier circuit and the input luminance signal to form a preemphasis signal, a subtracting circuit for subtracting the output signal of the first multiplier circuit from the input luminance signal to form a deemphasis signal, and a feedback loop for feeding back an output signal of the high pass filter circuit to an input port of the high pass filter circuit after passing through a second limiter circuit for limiting the amplitude of the signal passing therethrough at a second predetermined limiting level and a second multiplier circuit for modifying the amplitude of the signal passing therethrough by a second predetermined factor, in which the second predetermined limiting level of the second limiter circuit is set substantially higher than the first predetermined limiting level of the first limiter circuit. According to the present invention, the degree of emphasis is suppressed for the signal components having a medium and low frequency range as a result of the use of the second limiter circuit having the limiting level set substantially lower than the limiting level of the first limiter circuit. As a result of the use of two separate limiter circuits, one can optimize the limiting level of the limiter circuits and the undesirable loss of the signal components in the main preemphasis circuit which is connected to the noise reduction circuit of the present invention for establishing a standardized emphasis characteristic is minimized. Also the undesirable loss of the signal components in the white clip and dark clip circuits provided in the recording system of the video signal recording and/or reproducing system is minimized. Further, the noise reduction circuit of the present invention effectively suppresses the appearance of the horizontally streaking noise when a large noise impulse is applied.

Other objects and further features of the present invention will become apparent from the following detailed description when read in conjunction with the attached drawings.

BRIEF DESCRIPTION OF THE DRAWINGS

FIG. 1 is a block circuit diagram showing a prior art noise reduction circuit;

FIGS. 2(A)-(D) are waveform charts for explanation of the operation of the noise reduction circuit of FIG. 1;

FIG. 3 is a block circuit diagram showing a first embodiment of the noise reduction circuit of the present invention;

FIG. 4 is a diagram showing the relation between the limiting levels of two limiter circuits used in the noise reduction circuit of FIG. 3;

FIGS. 5(A)-(D) are waveform charts for explanation of the operation of the noise reduction circuit of FIG. 3;

DETAILED DESCRIPTION

Figure 6:
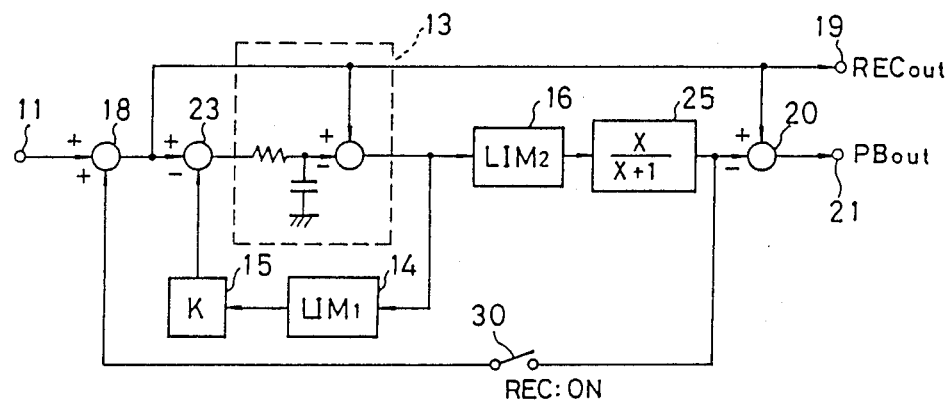
FIG. 6 is a block circuit diagram showing a second embodiment of the noise reduction circuit of the present invention.

FIG. 1 shows a block circuit diagram of a prior art noise reduction circuit as disclosed in the Laid-open Japanese Patent Application No. 27178/1988 in which the assignee of the present application is the applicant, and FIGS. 2(A)-(D) are waveform charts for explanation of the operation of the circuit of FIG. 1. This noise reduction circuit operates as a preemphasis circuit when a switch 22 is opened. In this mode of operation, an input luminance signal e applied to an input terminal 11 for recording is passed through a high pass filter circuit 13 where the low frequency component is filtered out from the original luminance signal. Thus, a high frequency component f of the luminance signal is extracted from the input luminance signal. The high frequency component f of the luminance signal thus obtained is then subjected to amplitude limitation in a limiter circuit 34 having a predetermined limiting level L. The limiter circuit 34 produces an output signal having an amplitude limited at the level L, and this output signal is on the one hand supplied to a multiplier circuit 36 which modifies the amplitude of the signal passing therethrough by a factor X and on the other hand to a summing circuit 12 connected at an input port of the high pass filter circuit 13 through a feedback loop including a multiplier circuit 35 for modifying the amplitude of the signal passing therethrough by a factor K. The multiplier circuit 35 produces an output signal which is added to the input luminance signal e at the summing circuit 12 and the waveform of the signal f is modified as will be described. The multiplier circuit 36 produces an output signal g which is added to the input luminance signal e at a summing circuit 18 and an output luminance signal h applied with the preemphasis is obtained at an output port of the summing circuit 18 which is connected to an output terminal 19.

When the switch 22 is closed, the circuit operates as a deemphasis circuit. In this mode of operation, a reproduced luminance signal already applied with preemphasis at the time of recording is applied to the input terminal 11. After passing through a subtracting circuit 20 which is described later, the input luminance signal is processed exactly in a same manner as in the case of preemphasis up to a point where the processed signal reaches the multiplier circuit 36. There, the output signal of the multiplier circuit 36 is looped back to the subtracting circuit 20 through the switch 22 now closed and the output signal of the multiplier circuit 36 is subtracted from the input luminance signal. Thus, the deemphasis is performed on the input luminance signal and the output luminance signal thus obtained is branched at an output port of the subtracting circuit 20 to an output terminal 21. As disclosed in the aforementioned Laid-open Japanese Patent Application No. 27178/1988, the random noise and the horizontally streaking noise are effectively suppressed by setting the time constant Ts of the high pass filter circuit as $T > Ts > T/(X+1)$.

In such a noise reduction circuit, the high pass filter circuit 13 produces the output signal f as shown in FIG. 2(B) responsive to the input signal e having a waveform as shown in FIG. 2(A). As a result of the provision of the feedback loop for feeding back the output signal of the limiter circuit 34 to the high pass filter circuit 13 via the summing circuit 12 and the multiplier circuit 35, the signal f has a waveform as illustrated in FIG. 2(B) which attenuates with the time constant Ts for those time intervals in which the level of the signal f exceeds the limiting level L of the limiter circuit 34. When the amplitude of the signal f is decreased below the level L, the signal f is attenuated with a time constant $Ts/(K+1)$. Here, the value of the parameter K is set so as to satisfy a relation $Ts/T=(K+1)/(X+1)$. Thus, the time constant $Ts/(K+1)$ which determines the attenuation of the signal f can be written as $T/(X+1)$. In other words, the level of the signal f reduces in accordance with the time constant $T/(X+1)$ when the level of the signal f is decreased below the level L. The parameter X is determined by the desired S/N ratio of the reproduced picture and usually set to more or less close to two ($X \cong 2$). The parameter T is determined on the basis of a selected frequency above which the effect of preemphasis and/or deemphasis should be effective. From experience, it is known that a desirable picture quality is obtained in the case that a relation $K(X+1) \cong 2$ is satisfied. Thus, the parameter K is usually set to $K \cong 0.67$.

It should be noted that the time constant Ts is set larger than the time constant $T/(X+1)$ as aforementioned in order to minimize both the random noise and the horizontally streaking noise. Thus, the time period in which the signal f attenuates with the time constant Ts is usually longer than the time period in which the signal f attenuates with the time constant $T/(X+1)$. When such a signal f is again passed through the limiter circuit 34 and the multiplier circuit 36, the output signal g takes a form as illustrated in FIG. 2(C). The output signal h obtained from the output terminal 19 then has a form as illustrated in FIG. 2(D). From the waveforms of the signals g and h in FIGS. 2(C) and (D), it can be clearly seen that these signals contain a considerable amount of low frequency signal components as represented in the flat "clipped" portion of the waveforms. This means that the emphasis is applied to the low frequency signal components at the time of preemphasis. Such an operation contradicts with the principle and purpose of the preemphasis. A similar problem also occurs at the time of deemphasis.

FIG. 3 shows a first embodiment of the noise reduction circuit of the present invention. In the drawing, those portions constructed identically to those corresponding portions of FIG. 1 are given the identical reference numerals and the description thereof will be omitted.

At the time of recording, the switch 22 is opened and the noise reduction circuit operates as a preemphasis circuit. The input luminance signal applied to the input terminal 11 is passed through the high pass filter circuit 13 comprising an integrator circuit and a subtractor circuit, and the high frequency component of the luminance signal extracted by the high pass filter circuit 13 is on one hand looped back to the high pass filter 13 via summing circuit 12 which is connected to the input port of the high pass filter circuit 13 after passing through a limiter circuit 14 for limiting the amplitude of the signal passing therethrough to a level LIM1 and a multiplier circuit 15 similar to the multiplier circuit 35 of FIG. 1. The high frequency component of the luminance signal thus looped back is added to the input luminance signal in the summing circuit 12 and passed through the high pass filter 13 again. The output signal of the high pass filter 13 is on the other hand supplied to a limiter circuit 16 for limiting the amplitude of the signal passing therethrough to a level LIM2 and then supplied to a multiplier circuit 17 for modifying the amplitude of the signal supplied thereto by the factor X which defines the degree of emphasis. The multiplier 17 is virtually the same as the multiplier 36 of FIG. 1. The output signal of the multiplier 17 is then supplied to the summing circuit 18 where it is added to the input luminance signal and an output luminance signal applied with preemphasis is obtained at the output terminal 19.

At the time of reproduction, the switch 12 is closed and the noise reduction circuit operates as a deemphasis circuit. The reproduced luminance signal applied to the input terminal 11 is processed in a same manner as the case of preemphasis up to a point where the signal reaches the multiplier circuit 17. The output signal of the multiplier circuit 17 is subtracted from the input luminance signal in the subtractor circuit 20 and the effect of preemphasis applied at the time of recording is compensated. Thus, an output luminance signal applied with deemphasis is obtained. The output luminance signal thus obtained is branched at the output port of the subtracting circuit 20 and supplied to the output terminal 21.

The time constant Ts of the high pass filter circuit 13 is chosen to satisfy the relation $$T > Ts > T/(X+1)$$

similarly to the case of FIG. 1 for elimination of the random noise and the horizontally streaking noise. Further, the parameters K and X are chosen to satisfy the relation $Ts/T=(K+1)/(X+1)$ as in the conventional case. Substituting the relation $Ts/T=(K+1)/(X+1)$ to the above inequality $T>Ts>T/(X+1)$, one can easily prove than there is a relation $0<K<X$. In other words, the parameter K of the multiplier circuit 15 is set smaller than the parameter X of the multiplier circuit 17.

In the present invention, the limiting level LIM1 of the limiter circuit 14 is set substantially larger than the limiting level LIM2 of the limiter circuit 16 as illustrated in FIG. 4. In other words, LIM1>LIM2. As a result, the time interval in which the noise reduction circuit operates with the large time constant Ts responsive to the incoming large and medium amplitude input luminance signals is effectively reduced without loss of the relation $T>Ts>T/(X+1)$ as will be explained hereinafter.

In operation, the high pass filter circuit 13 produces an output signal b as shown in FIG. 5(B) by a continuous line responsive to an input signal a shown in FIG. 5(A). For the purpose of comparison, the corresponding signal waveform of the output signal f of the high pass filter circuit 13 in the conventional noise reduction circuit is represented in FIG. 5(B) by a broken line. It should be noted that the limiting level L of FIG. 2(B) corresponds to the limiting level LIM2. As described previously, the signal b outputted from the high pass filter circuit 13 responsive to the input of the luminance signal having a waveform as illustrated in FIG. 5(A) attenuates with the time constant Ts in those time periods in which the level of the signal b exceeds the limiting level LIM1 but attenuates with the time constant $T/(X+1)$ when the level of the signal b is decreased below the limiting level LIM1. As the time constant Ts is set substantially larger than the time constant $T/(X+1)$, the signal b attenuates more quickly as a whole as the level of the signal b is below the level LIM1 in most of the time periods. In other words, as a result of the setting of the limiting level LIM1 of the limiter circuit 14 to a level substantially higher than the limiting level LIM2 of the limiter circuit 16, the signal b attenuates faster than the signal f and the duration for which the signal b persists is relatively confined.

When such a signal b is supplied to the limiter circuit 16, a signal c as illustrated in FIG. 5(C) is obtained. As clearly seen in FIG. 5(C), the interval in which the signal c remains unchanged is substantially reduced as compared to the signal g illustrated by the broken line in the same drawing. After modification of the amplitude in the multiplier circuit 17, the signal c is added to the input luminance signal a in the summing circuit 18. Thus an output luminance signal d as shown in FIG. 5(D) is obtained from the summing circuit 18. Again, the flat "clipped" portion of the signal d is significantly reduced as compared to that for the signal h of the conventional case as represented in the drawing by the broken line for comparison. In other words, the low frequency component in the signal d is significantly reduced as compared to the signal h.

It should be noted that the limiting level LIM2 of the limiter circuit 16 is closely related to the degree of emphasis to be achieved by the noise reduction circuit. As described previously, this level LIM2 corresponds to the limiting level L of the limiter circuit 34 of FIG. 1. Thus, by using two separate limiter circuits 14 and 17, the limiting level of the limiter circuit 16 can be optimized to such a value that the noise reduction circuit produces a desired degree of emphasis.

Thus, according to the present invention, the high frequency signal component associated with a large amplitude luminance signal can be attenuated quickly without deviating from the relation $T>Ts>T/(X+1)$. In other words, the noise reduction circuit of the present invention can effectively suppress the unwanted preemphasis or deemphasis of the medium or low frequency signal components even in such a case that a large or medium amplitude input luminance signal comes in.

FIG. 6 shows a second embodiment of the noise reduction circuit of the present invention. In the drawing, those portions constructed identically to those corresponding portions of FIG. 3 are given identical reference numerals and the description thereof will be omitted.

Referring to the drawing, the noise reduction circuit operates as the preemphasis circuit when a switch 30 is closed while the circuit operates as the deemphasis circuit when the switch 30 is opened. The input luminance signal at the input terminal 11 is passed through the high pass filter circuit 13 and the output signal of the high pass filter circuit 13 is on the one hand branched to the limiter circuit 14 and on the other hand supplied to the limiter circuit 16. The output signal of the limiter circuit 14 is passed through the multiplier circuit 15 and supplied to a subtracting circuit 23 interposed in a signal path extending from the summing circuit 18 to the high pass filter circuit 13. In the subtracting circuit 23, the output signal of the multiplier circuit 15 is subtracted from the input luminance signal and a signal thus produced is supplied to the high pass filter circuit 13 as aforementioned. The output signal of the limiter circuit 16 is supplied to a multiplier circuit 25 for modifying the amplitude of the signal passing therethrough by a factor $X/(X+1)$ and the output signal of the multiplier circuit 25 is supplied to the summing circuit 18 provided in the signal path extending from the input terminal 11 to the summing circuit 23 via a feedback loop including the switch 30 which is closed in the mode of preemphasis. In the summing circuit 18, the output signal of the multiplier circuit 25 supplied via the switch 30 is added to the input luminance signal and the output luminance signal applied with preemphasis is obtained at the output port of the summing circuit 18. This output luminance signal is then branched and outputted from the output terminal 19.

In the reproducing mode, the input luminance signal is processed in a similar manner to the case of preemphasis up to a point where the signal reaches the multiplier 25. Then, the output signal of the multiplier 25 is supplied to the subtracting circuit 20 where it is subtracted from the input reproduced luminance signal which is already applied with preemphasis, and the output luminance signal which is compensated with the effect of preemphasis is obtained at the output terminal 21. In the deemphasis mode of operation, it should be noted that the switch 30 is opened and the output signal of the multiplier circuit 25 is not looped back to the summing circuit 18.

Again, the time constant Ts of the noise reduction circuit is chosen to satisfy the relation:

$$T>Ts>T/(X+1)$$

In this embodiment, however, the parameter K is chosen according to a relation $Ts=(1-K)T$. Further, in order to satisfy the aforementioned inequality, the parameter $X/(X+1)$ of the multiplier circuit 25 is chosen to satisfy the relation $X/(X+1)>K>0$. Furthermore, as in the case of the first embodiment, the limiting levels LIM1 and LIM2 of the limiter circuits 14 and 16 are chosen so that LIM1>LIM2. Other aspects of the construction and operation of the present embodiment are identical to the circuit in FIG. 1 and further description will be omitted.

Figure 7:
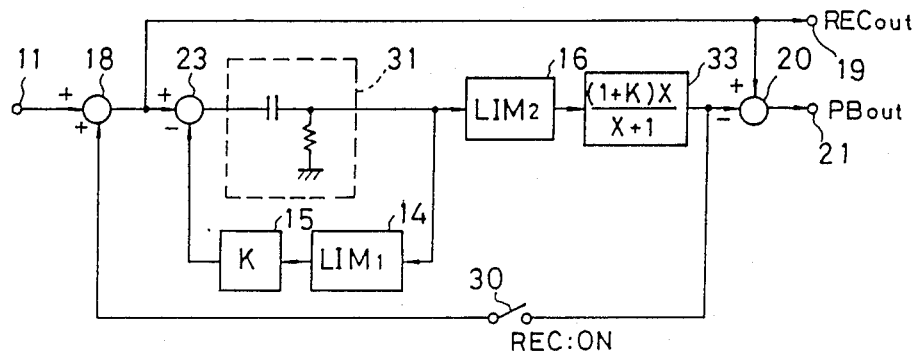
FIG. 7 is a block circuit diagram showing a third embodiment of the noise reduction circuit of the present invention.

FIG. 7 shows a block circuit diagram of a third embodiment of the noise reduction circuit of the present invention. In the drawing, those portions constructed identically to those corresponding portions of FIG. 6 are given identical reference numerals and the description thereof will be omitted.

Referring to FIG. 7, the input luminance signal applied to the input terminal 11 is passed through a high pass filter circuit 31 comprising a capacitor and a resistor arranged to form a differentiator circuit. The output signal of the high pass filter circuit 31 is on the one hand supplied to the limiter circuit 16 and on the other hand to the limiter circuit 14 as in the case of the previous embodiments. The output signal of the limiter circuit 16 is supplied to a multiplier circuit 33 which modifies the amplitude of the signal passing therethrough by a factor $(1+K)X/(X+1)$. In this embodiment again, the time constant Ts of the high pass filter circuit 31 is chosen to satisfy the relation $$T > Ts > T/(X+1)$$

and the parameter K is set to satisfy a relation $Ts = T/(K+1)$. Of course, the levels LIM1 and LIM2 of the limiter circuits 14 and 16 are chosen to satisfy the relation LIM1 > LIM2. As other construction and operation of the noise reduction circuit is identical to the first and second embodiments already described, further description thereof will be omitted.

Further, the present invention is not limited to these embodiments, but various variations and modifications may be made without departing from the scope of the present invention.

What is claimed is:

1. A noise reduction circuit for use in a video signal recording and/or reproducing apparatus for eliminating noise components from an input video signal comprising:
    an input terminal to which the input video signal is applied;
    high pass filter means having a predetermined time constant for extracting a high frequency signal component from the input video signal according to a predetermined frequency characteristic;
    first limiter means supplied with an output signal of the high pass filter means as an input signal for limiting the amplitude of the input signal supplied thereto at a first limiting level;
    first amplifying means supplied with an output signal of the first limiter means as an input signal for modifying the amplitude of the input signal supplied thereto by a first predetermined coefficient;
    first summing means supplied with an output signal of the first amplifying means and the input video signal for adding the output signal of the first amplifying means and the input video signal to produce a first output video signal;
    first subtracting means supplied with an output signal of the first amplifying means and the input video signal for subtracting the output signal of the first amplifying means from the input video signal to produce a second output video signal; and
    a feedback loop for feeding back the output signal of the high pass filter means to its input port including second limiter means supplied with the output signal of the high pass filter means as an input signal for limiting the amplitude of the input signal supplied thereto at a second limiting level which is set substantially higher than the first limiting level of the first limiter means, and second amplifying means supplied with an output signal of the second limiter means as an input signal for modifying the amplitude of the input signal supplied thereto by a second predetermined coefficient.

2. A noise reduction circuit as claimed in claim 1 in which said feedback loop further comprising a second summing means disposed in a signal path extending from the input terminal to the high pass filter means for adding an output signal of the second amplifying means to the input video signal, said first subtracting means being disposed in a signal path extending from the input terminal to the second summing means for subtracting from the input video signal the output signal of the first amplifying means supplied thereto through a second feedback loop extending from an output port of the first amplifying means to the first subtracting means and including a switch which is opened at the time of recording and closed at the time of reproduction, the first output signal being produced by the first summing means when the switch is opened and supplied to a first output terminal, the second output signal being produced by the first subtracting means when the switch is closed and branched from a signal path extending from the first subtracting means to the second summing means to a second output terminal.

3. A noise reduction circuit as claimed in claim 2 in which the time constant Ts of the high pass filter means, the first predetermined coefficient X of the first amplifying means and the second predetermined coefficient K of the second amplifying means are chosen so as to satisfy a relation $$Ts/T = (K+1)/(X+1)$$

where the parameter T stands for a time constant corresponding to a frequency defined by the predetermined characteristic of the high pass filter means above which the high pass filter means substantially passes the video signal supplied thereto, and the time constant Ts is further chosen to satisfy an inequality $$T > Ts > T/(X+1).$$

4. A noise reduction circuit as claimed in claim 1 in which said feedback loop further comprising a second subtracting means disposed in a signal path extending from the input terminal to the high pass filter means for subtracting the output signal of the second amplifying means from the input video signal, said first summing means being disposed in a signal path extending from the input terminal to the second subtracting means for adding to the input video signal the output signal of the first amplifying means supplied thereto through a second feedback loop extending from an output port of the first amplifying means to the first summing means and including a switch which is closed at the time of recording and opened at the time of reproduction, the first output signal being produced by the first summing means when the switch is closed and branched from a signal path extending from the first summing means to the second subtracting means to a first output terminal, the second output signal being produced by the first subtracting means when the switch is opened and supplied to a second output terminal.

5. A noise reduction circuit as claimed in claim 4 in which the time constant Ts of the high pass filter means, the first predetermined coefficient X of the first amplifying means and the second predetermined coefficient K of the second amplifying means are chosen so as to satisfy a relation $$Ts = (1-K)T$$

where the parameter T stands for a time constant corresponding to a frequency defined by the predetermined characteristic of the high pass filter means above which the high pass filter means substantially passes the video signal supplied thereto, and the time constant Ts is further chosen to satisfy an inequality $$T > Ts > T/(X+1).$$

6. A noise reduction circuit as claimed in claim 4 in which the time constant Ts of the high pass filter means, the first predetermined coefficient X of the first amplifying means and the second predetermined coefficient K of the second amplifying means are chosen so as to satisfy a relation $$Ts = T/(1+K)$$

where the parameter T stands for a time constant corresponding to a frequency defined by the predetermined characteristic of the high pass filter means above which the high pass filter means substantially passes the video signal supplied thereto, and the time constant Ts is further chosen to satisfy an inequality $$T > Ts > T/(X+1).$$

* * * * *